United States Patent
Nishiyama et al.

(10) Patent No.: US 11,511,310 B2
(45) Date of Patent: Nov. 29, 2022

(54) PREFORM COATING DEVICE

(71) Applicant: Suntory Holdings Limited, Osaka (JP)

(72) Inventors: Masanori Nishiyama, Tokyo (JP); Ichiro Tomari, Tokyo (JP); Ryo Yamane, Kanagawa (JP)

(73) Assignee: Suntory Holdings Limited, Osaka (JP)

( * ) Notice: Subject to any disclaimer, the term of this patent is extended or adjusted under 35 U.S.C. 154(b) by 210 days.

(21) Appl. No.: 16/957,140

(22) PCT Filed: Dec. 25, 2018

(86) PCT No.: PCT/JP2018/047685
§ 371 (c)(1),
(2) Date: Jun. 23, 2020

(87) PCT Pub. No.: WO2019/131687
PCT Pub. Date: Jul. 4, 2019

(65) Prior Publication Data
US 2020/0353501 A1    Nov. 12, 2020

(30) Foreign Application Priority Data

Dec. 25, 2017 (JP) .................................. 2017-248455

(51) Int. Cl.
*B05C 5/02* (2006.01)
*B05C 13/02* (2006.01)
(Continued)

(52) U.S. Cl.
CPC .......... *B05C 5/0275* (2013.01); *B05C 13/025* (2013.01); *B29C 49/22* (2013.01); *B29K 2067/003* (2013.01); *B29L 2031/7158* (2013.01)

(58) Field of Classification Search
None
See application file for complete search history.

(56) References Cited

U.S. PATENT DOCUMENTS 6,391,408 B1 * 5/2002 Hutchinson ............ C08J 7/0427
215/12.2
2010/0187720 A1    7/2010 Bates et al.
(Continued)

FOREIGN PATENT DOCUMENTS

CN    203577599 U  *  5/2014  ............ B05B 13/02
CN    203577599 U      5/2014
(Continued)

OTHER PUBLICATIONS

International Search Report dated Mar. 12, 2019 for PCT/JP2018/047685.
(Continued)

*Primary Examiner* — Jethro M. Pence
(74) *Attorney, Agent, or Firm* — Faegre Drinker Biddle & Reath LLP (57) ABSTRACT

A preform coating device is provided with: a plurality of rotational holding parts that horizontally hold a preform; a conveyance part that conveys the preform by moving the plurality of rotational holding parts, the plurality of rotational holding parts being disposed at a predetermined interval along the conveyance route of the conveyance part; and a dispenser that discharges a coating liquid toward the preform. The dispenser has: a head including a mechanism for feeding the coating liquid; and a plurality of nozzles that are in fluid communication with the head and that each include a slot for discharging the coating liquid. The plurality of nozzles are disposed at a predetermined interval along the conveyance route. The interval between the plurality of nozzles is equal to the interval between the plurality of rotational holding parts.

3 Claims, 8 Drawing Sheets

(51) Int. Cl.
  *B29C 49/22* (2006.01)
  *B29K 67/00* (2006.01)
  *B29L 31/00* (2006.01)

(56) References Cited

U.S. PATENT DOCUMENTS

2012/0306126 A1   12/2012   Fuss et al.
2017/0136677 A1   5/2017    Sugimori et al.
2018/0264517 A1   9/2018    Tomari et al.

FOREIGN PATENT DOCUMENTS

| | | | |
|---|---|---|---|
| CN | 105964493 A | 9/2016 | |
| CN | 107442361 A | 12/2017 | |
| CN | 206783760 U | * 12/2017 | ............. C23C 18/16 |
| CN | 206783760 U | 12/2017 | |
| JP | S59-216654 A | 12/1984 | |
| JP | 2012-250771 A | 12/2012 | |
| JP | 2014-151632 A | 8/2014 | |
| JP | 2015-199012 A | 11/2015 | |
| JP | 2017-64640 A | 4/2017 | |
| JP | 2017-65149 A | 4/2017 | |

OTHER PUBLICATIONS

Metal Surface Engineering, Liu Jiangnan, p. 212. Ordnance Industry Press, Dec. 1995.

Wu Pei, et al.: "Building water supply and drainage and fire protection engineering", p. 78-79, Huazhong University of Science and Technology (Nov. 30, 2017).

* cited by examiner

PREFORM COATING DEVICE

CROSS REFERENCES TO RELATED APPLICATIONS

This application is the National Stage of International Application No. PCT/JP2018/047685 filed Dec. 25, 2018, and claims benefit of Japanese Application No. 2017-248455 filed on Dec. 25, 2017.

FIELD

The present invention relates to a preform coating device for coating a plastic bottle preform with a coating solution.

BACKGROUND

Today, plastic bottles such as polyethylene terephthalate (PET) plastic containers (PET bottles) are widely used for storing beverages or food. Plastic bottles are molded by inflating a test tube-like preform by stretch blow molding.

As disclosed in Patent Literature 1, forming a barrier coating on the outer peripheral surface of the preform to reduce the penetration of gases such as oxygen and carbon dioxide into and out of the plastic bottle is known. The barrier coating is formed by applying a coating solution to the outer peripheral surface of the preform and drying the applied coating solution.

The preform coating devices described in, for example, Patent Literature 2 and 3 are known as devices for forming a coating. In these devices, one or a plurality of preforms are conveyed by a conveyance part such as a belt conveyor or a chain conveyor, and a coating solution is discharged toward the horizontally retained preform from a dispenser.

CITATION LIST

Patent Literature

[PTL 1] Japanese Unexamined Patent Publication (Kokai) No. 2012-250771
[PTL 2] Japanese Unexamined Patent Publication (Kokai) No. 2017-64640
[PTL 3] Japanese Unexamined Patent Publication (Kokai) No. 2017-65149

SUMMARY

Technical Problem

In the relevant technical field, the development of a device which can form coatings on a larger number of preforms in a short period of time without an increase in the installation area or production costs is desired.

Solution to Problem

An aspect of the present disclosure provides a preform coating device comprising a plurality of rotary retention parts, each of which horizontally retains a preform and rotates the preform about an axis of the preform, a conveyance part that conveys the preforms by moving the plurality of rotary retention parts, the plurality of rotary retention parts being arranged at predetermined intervals along a conveyance path of the conveyance part, and a first dispenser that discharges coating solution toward the preform, wherein the first dispenser comprises a head having a structure for feeding the coating solution, and a plurality of nozzles in fluid communication with the head, each of the plurality of nozzles having a slot for discharging the coating solution, the plurality of nozzles are arranged at predetermined intervals along the conveyance path, and the intervals between the plurality of nozzles are equal to the intervals between the plurality of rotary retention parts.

In the preform coating device according to the aspect of the present disclosure, the dispenser has a plurality of nozzles for a single head. Thus, coating solution can be discharged simultaneously by a plurality of nozzles without an increase in the number of relatively expensive heads. Furthermore, the intervals between the plurality of nozzles is set so as to be equal to the intervals between the plurality of rotary retention parts. Thus, a coating can be formed simultaneously on a plurality of preforms without enlarging the conveyance part. Therefore, a coating can be formed on a larger number of preforms in a short period of time, without increasing the installation area or production costs.

At least one of the plurality of nozzles may have a length adjustment mechanism for adjusting a distance from the head to the slot of the nozzle. In this case, the interval between at least one nozzle and a preform can be adjusted without changing the position of the head. Thus, for example, when there is variation in the discharge range of the coating solution among the plurality of nozzles, the distance from the head to the slot of at least one nozzle can be adjusted so that coatings can be equally formed on a plurality of preforms.

At least one of the plurality of nozzles may have a flow rate adjustment mechanism for adjusting a discharge amount of the coating solution from the nozzle. In this case, the discharge amount of the coating solution from at least one nozzle can be adjusted so that coating solution are equally discharged from the plurality of nozzles.

The preform coating device may further comprise a second dispenser having the same structure as the first dispenser, one of the first and second dispensers may be arranged below the preform to be coated so as to discharge the coating solution upwardly, and the other of the first and second dispensers may be arranged above the preform to be coated so as to discharge the coating solution downwardly. In this case, since one of the first and second dispensers is arranged below the preform and the other of the first and second dispensers is arranged above the preform, it is possible to prevent interference with components such as fasteners and frames for affixation of the dispensers. Thus, enlargement of the device can be prevented. Furthermore, in the dispenser, gas may enter from the slot and bubbles may be present inside the dispenser. Since bubbles can impact the quality of the coating, it is preferable that the bubbles be removed from inside the dispenser. In the dispenser which discharges the coating solution upward, air bubbles naturally rise in the nozzle and are discharged from the slot. Therefore, bubbles can easily be removed from one of the first and second dispensers.

The plurality of nozzles of the first dispenser and the plurality of nozzles of the second dispensers may be arranged alternatingly in the direction along the conveyance path. In this case, the first and second dispensers have overlapping regions in the direction along the conveyor path. Thus, the area for arranging the first and second dispensers can be reduced.

Advantageous Effects of Invention

According to the present invention, a device which can form a coating on a larger number of preforms in a short

DESCRIPTION OF EMBODIMENTS

The embodiments of the present invention will be described in detail below with reference to the attached drawings. Note that in the description below, identical components are assigned the same reference sign.

<Plastic Bottle Molding Method>

Figure 2:
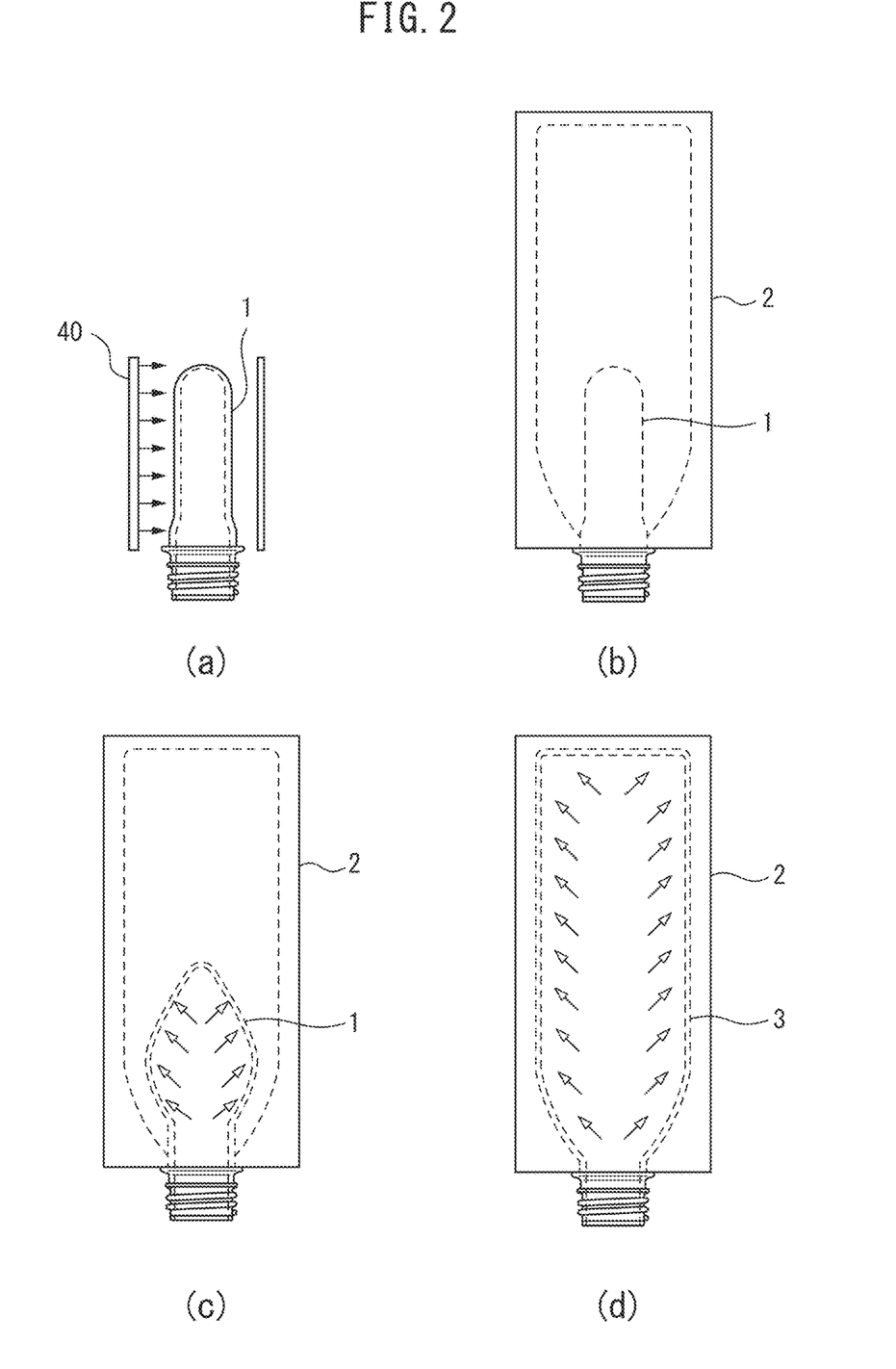
FIGS. 2(a) to (d) show a stretch blow molding method for molding a plastic bottle from a preform.
Figure 3:
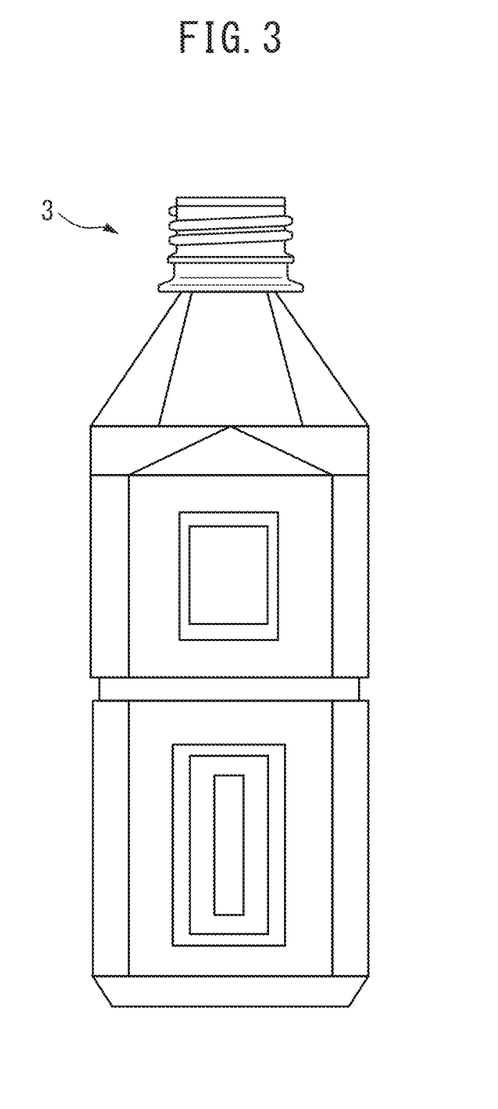
FIG. 3 shows a plastic bottle molded from a preform.

A method for molding a plastic bottle from a preform will be briefly described with reference to FIGS. 1 to 3. Note that as used herein, "plastic bottle" means a bottle composed of a plastic such as polyethylene terephthalate (PET), polypropylene (PP), or polyethylene (PE), and is not limited to PET bottles.

Figure 1:
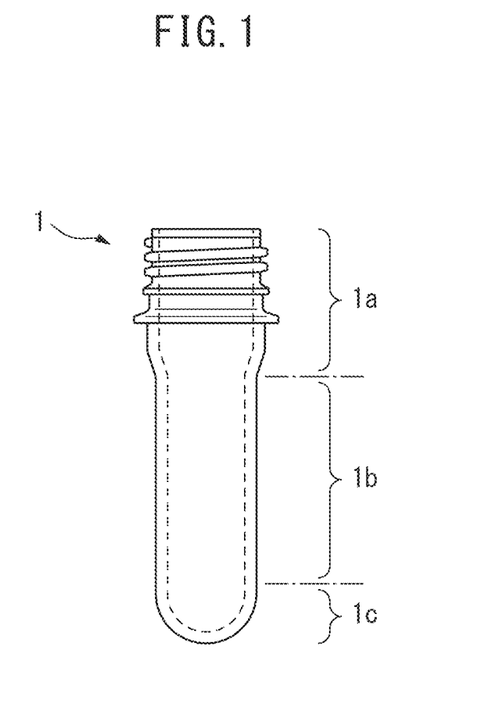
FIG. 1 shows a plastic bottle preform.

FIG. 1 shows a plastic bottle preform 1. The preform 1 is molded from a resin by injection molding or PCM (preform compression molding). The preform 1 comprises an opening 1a fitting with a plastic bottle cap, a cylindrical body 1b adjacent the opening 1a, and a bottom 1c for closing one end of the cylindrical body 1b, and has a test tube-like shape. Male threading which engages with female threading of the plastic bottle cap is formed on the outer peripheral surface of the opening 1a. The end of the preform 1 on the opening 1a side is open.

After molding of the preform 1, a barrier coating is formed on the outer peripheral surface of the preform 1. The barrier coating is formed by applying a coating solution to the outer peripheral surface of the preform 1 and drying the applied coating solution. The barrier coating can reduce the transmission of gases such as oxygen and carbon dioxide into and out of the plastic bottle molded from the preform 1 and extend the shelf life of beverages and the like contained in the plastic bottle. The barrier coating can also improve the scratch resistance and moisture resistance of the plastic bottle.

Plastic bottles are molded from a preform 1 by stretch blow molding. FIGS. 2(a) to (d) show the stretch blow molding method for molding a plastic bottle 3 from a preform 1. First, as shown in FIG. 2(a), the preform 1 is heated by a preform heating device 40. Next, as shown in FIG. 2(b), the preform 1 is inserted into a mold 2 and the mold 2 is closed. Next, as shown in FIG. 2(c), the preform 1 is stretched longitudinally with a stretching rod (not shown) and transversely with pressurized air. Next, as shown in FIG. 2(d), once the preform 1 has expanded to the desired shape, the inner surface of the plastic bottle 3 is cooled by cooling air, and the plastic bottle 3 is ultimately removed from the mold 2. FIG. 3 shows the plastic bottle 3 molded from the preform 1.

<Preform Coating Device>

Figure 4:
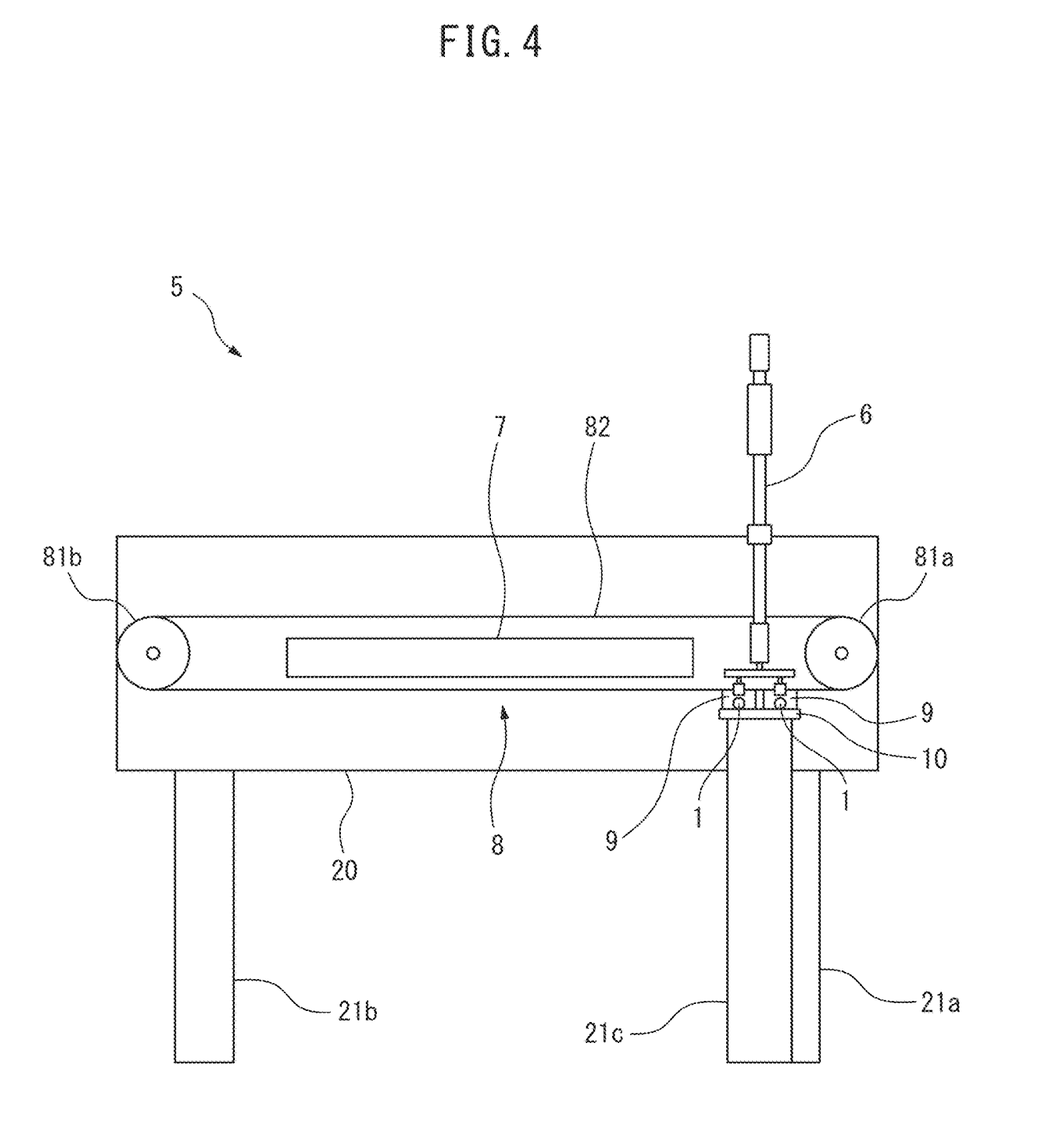
FIG. 4 is a schematic front view of the main portions of a preform coating device according to a first embodiment of the present invention.

The preform coating device according to the first embodiment of the present invention will be described in detail below with reference to FIGS. 4 to 6. FIG. 4 is a schematic front view of the main portions of a preform coating device 5 according to the first embodiment of the present invention.

The preform coating device 5 is configured so as to form a barrier coating on the outer peripheral surface of the preform 1 by applying a coating solution to the preform 1 and drying the applied coating solution. To this end, the preform coating device 5 comprises a dispenser 6 for applying a coating solution to the preform 1, and a dryer 7 for drying the applied coating solution. The dryer 7 is arranged spaced apart from the dispenser 6. In the present embodiment, the dryer 7 is arranged horizontally spaced apart from the dispenser 6.

The preform coating device 5 further comprises a conveyance part 8 for conveying the preform 1. The conveyance part 8 moves the preform 1 from the location of the dispenser 6 toward the location of the dryer 7. In the present embodiment, the conveyance part 8 is a belt conveyor. The conveyance part 8 includes two pulleys 81a, 81b, and a belt 82 hung on the pulleys 81a, 81b. The pulleys 81a, 81b are rotatably secured to a pulley support plate 20 which extends in the horizontal direction. The pulley support plate 20 is supported by two supporting columns 21a, 21b which extend in the vertical direction. One of the pulleys 81a, 81b is driven by a motor (not illustrated). By rotating one of the pullies 81a, 81b clockwise in FIG. 4, the belt 82 moves clockwise in FIG. 4. As a result, the conveyance part 8 can convey a preform 1. Note that the number of pullies may be three or more. The conveyance part 8 may be another mechanism such as a chain conveyor, as long as it can convey the preform 1.

The preform coating device 5 further comprises a plurality (two in the present embodiment) of rotary retention parts 9 which horizontally retain the preform 1 and which rotate the preform 1 about the axis A of the preform 1. The plurality of rotary retention parts 9 are arranged at predetermined intervals along the conveyance path of the conveyance part 8. The intervals between the plurality of rotary retention parts 9 can be arbitrarily determined in consideration of, for example, the pitch of the belt or chain of the conveyance part 8 and the diameter of the preform. The preform coating device 5 may comprise three or more rotary retention parts 9. The preform coating device 5 may comprise a plurality of rotary retention parts 9 along the entire circumference of the conveyance path of the conveyance part 8. In this case, in order to transport more preforms 1 without enlarging the conveyance part 8, it is desirable that the intervals between the plurality of rotary retention parts 9 be as small as possible. The plurality of rotary retention parts 9 may be divided into a plurality of batches. In this case, the intervals between batches may be different than the intervals between the rotary retention parts 9.

Figure 5:
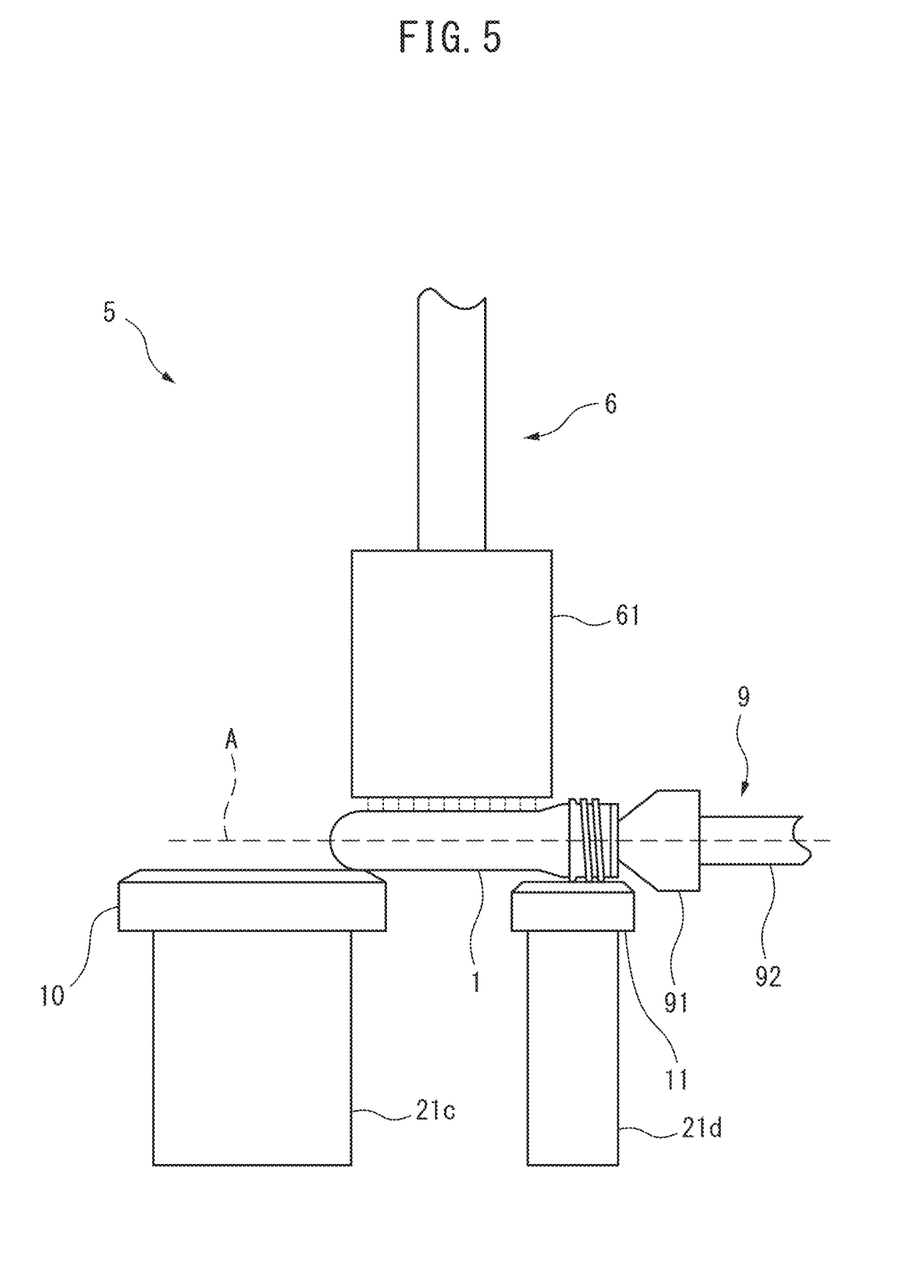
FIG. 5 is a schematic partial side view of the preform coating device at the time of application of a coating solution, according to the first embodiment.

FIG. 5 is a schematic partial side view of the preform coating device 5 at the time of application of the coating solution. Note that FIG. 5 shows the preform coating device 5 as viewed from the right side in FIG. 4, and thus, only a single rotary retention part 9 (and only a single nozzle 61) is shown. The rotary retention part 9 includes a chuck 91 for retaining the opening 1a of the preform 1, and a rotary shaft 92 connected to the chuck 91.

The rotary retention part 9 retains the preform 1 in the horizontal direction by retaining the opening 1a of the preform 1 with the chuck 91. Thus, the preform 1 is cantilevered by the rotary retention part 9. The chuck 91 is, for example, a vacuum chuck that suctions the preform 1 with air, or a mechanical chuck that mechanically retains the preform 1. Note that though the chuck 91 in the present embodiment retains the interior of the opening 1a of the preform 1, the chuck 91 may retain the exterior of the opening 1a of the preform 1.

The rotary shaft 92 is driven by a motor (not illustrated) and rotates together with the chuck 91. The axis of the rotary shaft 92 is co-axial with the axis A of the preform 1. Thus, by rotating the rotary retention part 9, the preform 1 can be rotated about the axis A thereof. As shown in FIG. 4, the rotary retention parts 9 are connected to the belt 82. Thus, the conveyance part 8 can convey the preforms 1 by moving the rotary retention part 9.

The dispenser 6 is arranged above the cylindrical body 1b. The dispenser 6 houses the coating solution and discharges the coating solution toward the preform 1. The coating solution is supplied to the dispenser 6 by a pump or the like.

Figure 6:
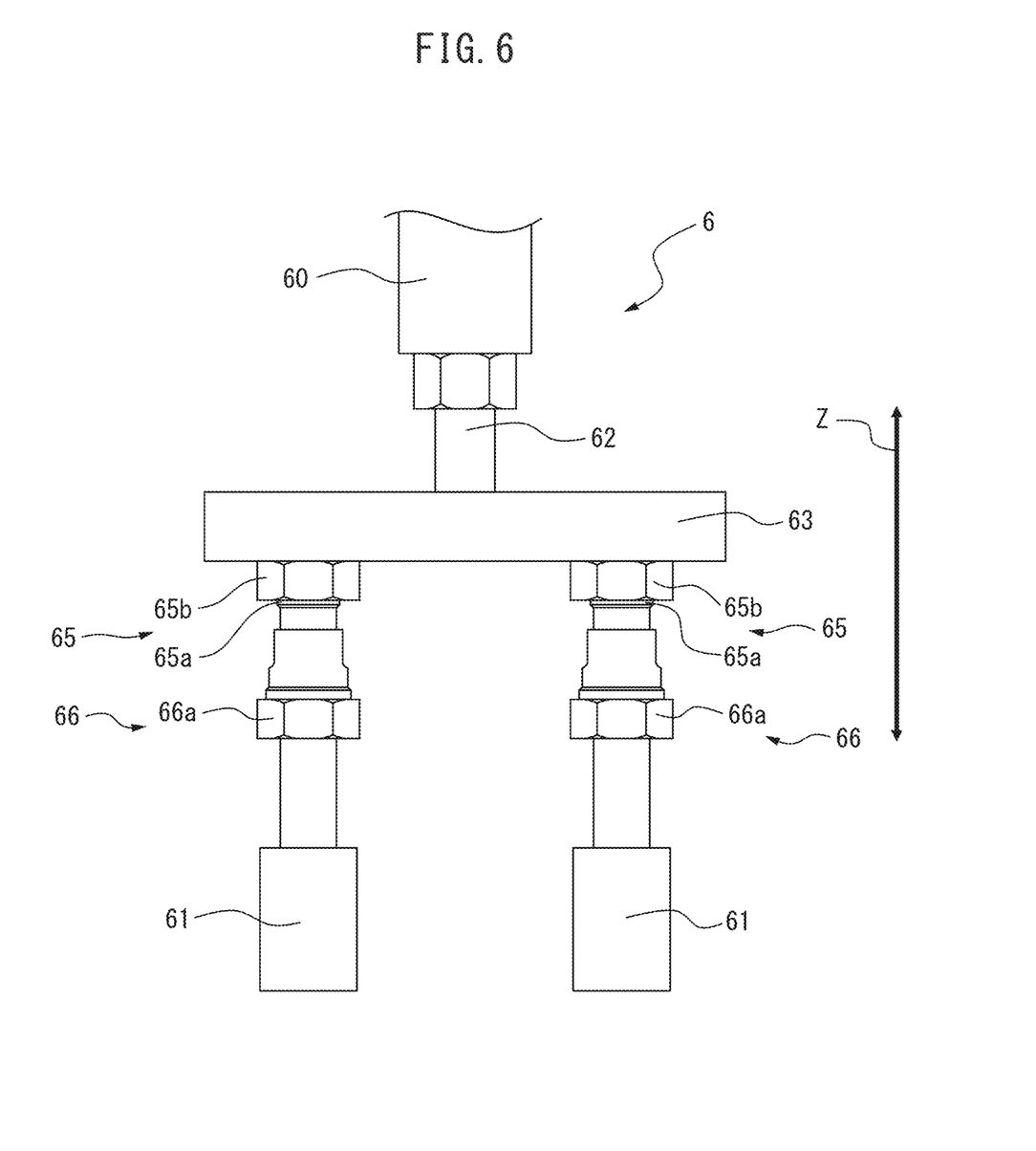
FIG. 6 is a partial front view of a dispenser.

FIG. 6 is a partial front view of the dispenser 6. Referring to FIG. 6, the dispenser 6 comprises a head 60, a shaft 62, a plate 63, and a plurality (two in the present embodiment) of nozzles 61. Note that the dispenser 6 may have three or more nozzles 61. The dispenser 6 can be affixed to, for example, an unillustrated frame or floor, with using an arbitrary fastener.

The head 60 may have a mechanism for feeding coating solution to the nozzles 61, for example, uniaxial eccentric screw pump or other type of pump, or a pneumatic dispenser which discharges the coating solution by the power of compressed air.

The shaft 62 extends downwardly from the head 60. The shaft 62 has a flow path which is in fluid communication with the discharge mechanism of the head 60. The plate 63 has an elongate plate-like shape and is attached to the lower end of the shaft 62 so that the longitudinal direction thereof is perpendicular to the central axis of the shaft 62 and is oriented in the conveyance direction of the conveyor part 8. The plate 63 has a flow path which is in fluid communication with the flow path of the shaft 62 and this flow path is divided in two directions along the longitudinal direction of the plate 63.

Each nozzle 61 extends downward from the lower surface of the plate 63. The plurality of nozzles 61 are attached to the plate 63 at predetermined intervals along the longitudinal direction of the plate 63 (i.e., along the conveyance path of the conveyance part 8). The intervals between the plurality of nozzles 61 are set so as to be equal to the distances between the plurality of rotary retention parts 9. Each nozzle 61 has a flow path which is in fluid communication with one of the divided flow paths of the plate 63. Each nozzle 61 has a length adjustment mechanism 65 and a flow rate adjustment mechanism 66.

The length adjustment mechanism 65 includes male threading 65a formed on the upper end of the nozzle 61 and a nut 65b. The male threading 65a can engage with female threading (not illustrated) formed in the plate 63, and by securing the nozzle 61 with the nut 65b at a predetermined position relative to the plate 63, the distance from the head 60 to the slot of the respective nozzle 61 can be adjusted independent of the other nozzle 61.

The flow rate adjustment mechanism 66 may have a structure such as a throttle valve. The flow rate adjustment mechanism 66 can be configured, for example, to narrow the flow path of the nozzle 61 by tightening the nut 66a and to widen the flow path of the nozzle 61 by loosening the nut 66a. According to such a configuration, the discharge amount of coating solution from each nozzle 61 can be adjusted.

A slot is formed in the tip of each nozzle 61. Each nozzle 61 discharges the coating solution in a planar-like shape from the slot toward the cylindrical body 1b of the preform 1. The width of the slot (the length in the axial direction of the preform 1) can be adjusted and is, for example, 15 mm to 40 mm. The vertical width of the slot (the length in the direction orthogonal to the axial direction of the preform 1) can be adjusted and is, for example, 0.1 mm to 1.0 mm. The dispenser 6 can move in the vertical direction, as illustrated by arrow Z of FIG. 6. Thus, the distance between the slot of the nozzle 61 and the cylindrical body 1b of the preform 1 can be adjusted. Note that though the coating solution is discharged from above the preform 1 in the present embodiment, the coating solution may be discharged in other directions, for example, from below the preform 1. Also in this case, the dispenser 6 is configured so that the distance between the slot of the nozzle 61 and the cylindrical body 1b of the preform 1 can be adjusted.

The conveyance part 8 does not move the rotary retention parts 9 while the dispenser 6 discharges coating solution. In contrast, the rotary retention part 9 rotates the preform 1 while the dispenser 6 discharges coating solution. The dispenser 6 continues to discharge coating solution while the preform 1 makes substantially one rotation. The discharged coating solution is wound up by the outer peripheral surface of the cylindrical body 1b of the preform 1. As a result, coating solution is applied to the entirety of the outer peripheral surface of the cylindrical body 1b of the preform 1. At this time, since the preform 1 is retained in the horizontal direction, the thickness of the coating solution is prevented from gradually increasing toward the bottom 1c of the preform 1 due to gravity.

However, in the present embodiment, since the preform 1 is cantilevered by the rotary retention part 9, the outer peripheral surface of the preform 1 on the bottom 1c side tends to move away from the axis A of the preform 1 by the rotation of the preform 1. In other words, the rotation of the preform 1 causes eccentricity of the preform 1. As a result, the thickness of the coating solution applied to the preform 1 may not be uniform.

Referring to FIG. 5, in the present embodiment, in order to suppress eccentricity of the preform 1, the preform coating device 5 further comprises a preform support part 10. The preform support part 10 can have, for example, a flat surface which comes into contact with the preform 1. Chamfering for smooth contact with the moving preform 1 may be formed on the surface of the preform support part 10 which comes into contact with the preform 1. The preform support part 10 is supported and secured by a supporting column 21c. The preform support part 10 rotatably supports the preform 1 at least while the dispenser 6 discharges the coating solution. The preform support part 10 supports the end of the cylindrical body 1b of the preform 1 on the bottom 1c side so as not to contact the applied coating solution. At least a portion of the preform support part 10 which contacts the preform 1 is made of a resin, and is preferably made of polyoxymethylene (POM). Thus, it is possible to effectively prevent eccentricity of the preform 1 and to prevent the preform 1 from being damaged by the contact between the preform support part 10 and the preform 1. In the present embodiment, the preform support part 10 can support a plurality of preforms 1 (refer to FIG. 4).

The present inventors have discovered that in some cases (for example, when the preform 1 is for a plastic bottle for a carbonated beverage and is relatively long and/or heavy), eccentricity of the preform 1 may occur even though preform 1 is supported at both ends by the rotary retention part 9 and the preform support part 10. The present inventors have discovered that the vertical positional accuracy and/or retention accuracy of the chuck 91 of the rotary retention part 9 may influence the eccentricity of the preform 1. The present inventors have realized that by supporting the outer peripheral surface of the opening 1a of the preform 1, the eccentricity of the preform 1 can be reduced regardless of the vertical positional accuracy and/or retention accuracy of the chuck 91.

Referring to FIG. 5, in the present embodiment, in order to further suppress eccentricity of the preform 1, the preform coating device 5 further comprises an opening support part 11. The opening support part 11 can have, for example, a flat surface which comes into contact with the opening 1a. Chamfering for smooth contact with the moving preform 1 may be formed on the surface of the opening support part 11 which comes into contact with the preform 1. The opening support part 11 is supported by a supporting column 21d. The opening support part 11 rotatably supports the outer peripheral surface of the opening 1a of the preform 1 at least while the dispenser 6 discharges the coating solution. As a result, the opening 1a of the preform 1 is arranged at a fixed position by the opening support part 11 regardless of the vertical positional accuracy and/or the retention accuracy of the chuck 91. Thus, eccentricity of the preform 1 can be effectively suppressed.

Referring to FIG. 1, the opening support part 11 can support various portions of the outer peripheral surface of the opening 1a (i.e., portions of the preform 1 to which the coating solution is not applied and which include an opening). For example, on the outer peripheral surface of the opening 1a, the opening support part 11 may support one or more locations among the radially outermost protruding portion from the axis, the portion on which the male threading is formed, or the portion between the radially outermost protruding portion and the cylindrical body 1b. When the chuck 91 retains the outer periphery of the opening 1a, the opening support part 11 can support portions which do not interfere with the chuck 91. At least the portion of the opening support part 11 which comes into contact with the opening 1a is made of a resin, and is preferably made of polyoxymethylene. This can prevent the opening 1a from being damaged by the contact between the opening support part 11 and the opening 1a. In the present embodiment, the opening support part 11 supports the openings 1a of a plurality of preforms 1.

Referring to FIG. 4, after the coating solution has been applied, the preform 1 is conveyed to the position of the dryer 7 by the conveyance part 8. The conveyance part 8 conveys the horizontally retained preform 1. As a result, movement of the coating solution toward the bottom 1c of the preform 1 due to gravity during conveyance of the preform 1 is suppressed. Thus, according to the present embodiment, variation in the thickness of the coating layer on the outer peripheral surface of the preform 1 can be reduced.

The dryer 7 is, for example, a carbon heater or a far-infrared heater. Both a carbon heater and a far-infrared heater may be used as the dryer 7. The dryer 7 may be configured so as to dry the coating solution with light or gas. The rotary retention part 9 rotates the preform 1 during drying of the coating solution by the dryer 7. As a result, the coating solution applied to the preform 1 can be uniformly dried.

After the coating solution has dried, the conveyance part 8 conveys the preform 1 to the downstream of the dryer 7. Thereafter, the rotary retention part 9 releases the preform 1 and the preform 1 is removed from the preform coating device 5. Thus, according to the preform coating device 5, formation of a barrier coating on the outer peripheral surface of the preform 1 can be automated.

The coating solution used in the present embodiment is a barrier coating solution having a gas barrier function such as a polyvinyl alcohol (PVA) solution. Note that the coating solution may be a solution of a barrier resin such as a water-soluble polyamide, water-soluble polyester, polyvinylidene chloride (PVDC), polyacrylonitrile, ethylene-vinyl alcohol copolymer resin (EVOH), or polyglycolic acid. The coating solution may be obtained by adding an inorganic material to any of the solutions described above. The viscosity of the barrier coating solution is, for example, 25 mPa·s or more and 10000 mPa·s or less.

Note that after the barrier coating solution applied to the preform 1 has dried, a protective coating solution for protecting the barrier coating solution may be further applied on the barrier coating solution. The protective coating solution is a water-insoluble coating agent such as, for example, a polyolefin dispersion solution, various modified polyolefin dispersion solutions, or polyvinyl butyral (PVB). The viscosity of the protective coating solution may be, for example, 0.5 mPa·s or more and 100 mPa·s or less. Like the barrier coating solution, the protective coating solution can be applied to the preform 1 using the preform coating device 5.

In the preform coating device 5 according to the present embodiment described above, the dispenser 6 comprises a plurality of nozzles 61 for a single head 60. Thus, the coating solution can be discharged simultaneously by a plurality of nozzles 61 without an increase in the number of relatively expensive heads 60. Furthermore, the intervals between the plurality of nozzles 61 is set so as to be equal to the intervals between the plurality of retention parts 9. Thus, a coating can be formed simultaneously on a plurality of preforms 1 without enlarging the conveyance part 8. Therefore, a coating can be formed on a larger number of preforms in a short period of time without increasing the installation area or production costs.

In the preform coating device 5, each nozzle 61 comprises a length adjustment mechanism 65 for adjusting the distance from the head 60 to the slot of the nozzle 61. Thus, the interval between the slot of the nozzle 61 and the preform 1 can be adjusted without changing the position of the head 60. Thus, for example, when there is variation in the discharge range of the coating solution between the plurality of nozzles 61, the distance from the head 60 to the slot of the nozzle 61 can be adjusted so that coatings can be equally formed on the plurality of preforms 1.

In the preform coating device 5, each nozzle 61 comprises a flow rate adjustment mechanism 66 for adjusting the discharge amount of the coating solution from the nozzle 61. Thus, the discharge amount of the coating solution from the nozzle 61 can be adjusted so that coatings are equally formed on a plurality of preforms 1.

The preform coating device 5 comprises a preform support part 10 for supporting the end of the cylindrical body 1b of the preform 1 on the bottom 1c side, and an opening support part 11 for supporting the outer peripheral surface of the opening 1a of the preform 1. Thus, the end on the bottom 1c side and the opening 1a of the preform 1 are supported in fixed positions regardless of the vertical positional accuracy and/or retention accuracy of the rotary retention parts 9. Thus, eccentricity of the preform 1 during rotation can be suppressed, whereby a coating can be more accurately formed on the preform 1.

In the preform coating device 5, the opening support part 11 can support various portions of the outer peripheral surface of the opening 1a of the preform 1. For example, the opening support part 11 may support the radially outermost protruding portion from the axis A.

In the preform coating device 5, the rotary retention part 9 can support various portions of the opening 1a of the preform 1. For example, the rotary retention part 9 may retain the interior of the opening 1a of the preform 1.

In the preform coating device 5, the preform 1 may be for a plastic bottle for a carbonated beverage. Plastic bottles for carbonated beverages may be formed so as to have a high strength and thus a higher weight in order to withstand internal pressures. Thus, eccentricity of preform 1 may occur due to the high weight. Therefore, the effect of suppressing eccentricity can be suitably exhibited.

Figure 7:
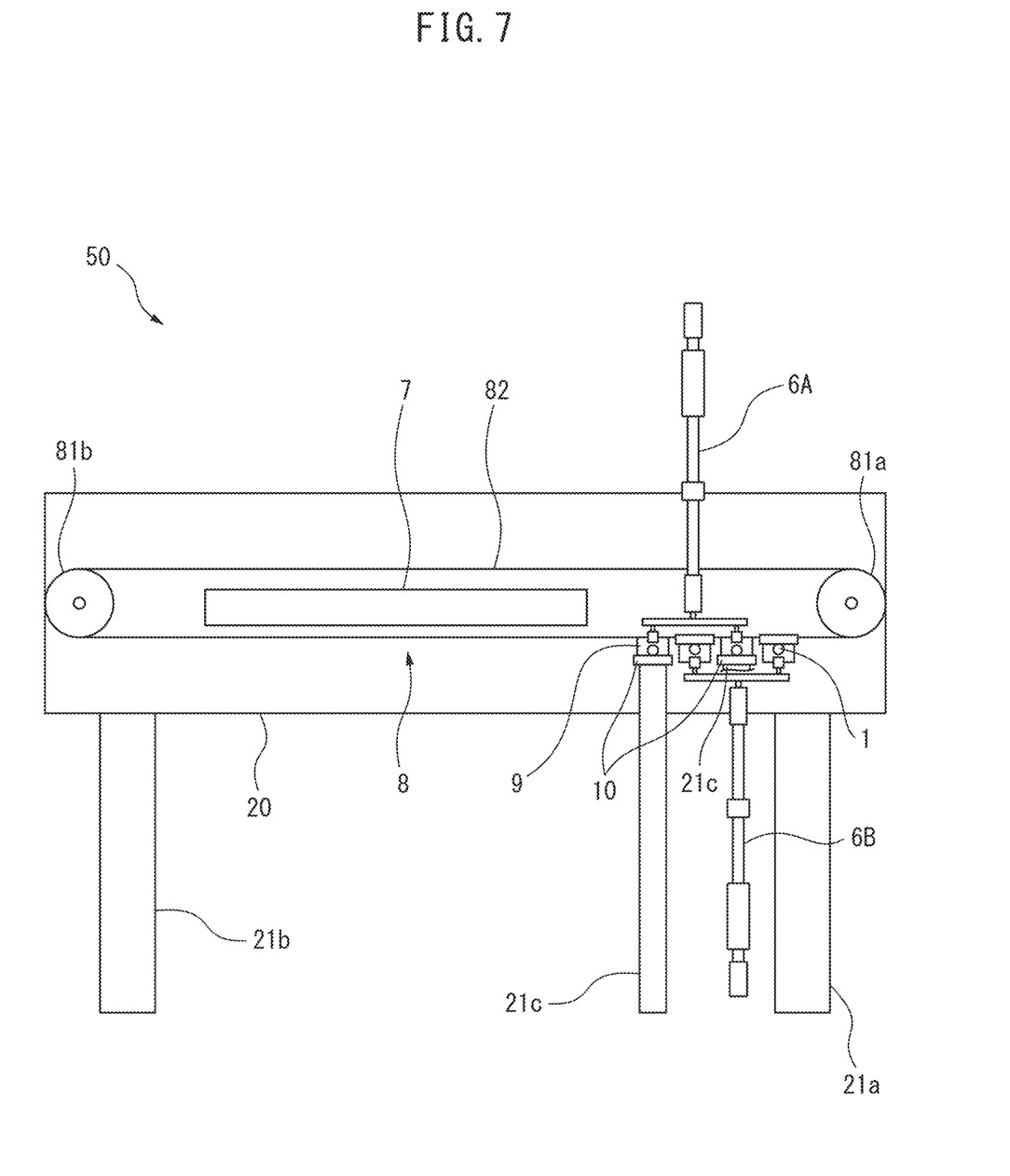
FIG. 7 is a schematic front view of the main portions of a preform coating device according to a second embodiment of the present invention.

Next, a preform coating device 50 according to a second embodiment will be described.

FIG. 7 is a schematic front view of the main portions of the preform coating device 50 according to the second embodiment of the present invention. Referring to FIG. 7, the preform coating device 50 differs from the preform coating device 5 according to the first embodiment mainly in that it comprises two dispensers 6A, 6B.

The dispenser 6A differs from the dispenser 6 according to the first embodiment in that the intervals of the plurality (two in the present embodiment) of nozzles 61 are larger than the intervals between the plurality of nozzles 61 of the dispenser 6 according to the first embodiment. The other components of the dispenser 6A can be configured in the same manner as the corresponding components of the dispenser 6.

Though the dispenser 6B has the same structure as the dispenser 6A, dispenser 6B is arranged in the opposite direction of the dispenser 6A. Specifically, like the dispenser 6 according to the first embodiment, the dispenser 6A has a plurality of downward-facing nozzles 61 for discharging coating solution downwardly and is arranged above the preform 1 to be coated. In contrast, the dispenser 6B has a plurality of upward-facing nozzles 61 for discharging coating solution upwardly and is arranged below the preform 1 to be coated.

In the present embodiment, the plurality of nozzles 61 of the dispenser 6A and the plurality of nozzles 61 of the dispenser 6B are alternatingly arranged in the direction along the conveyance path of the conveyance part 8. Thus, the dispenser 6A and the dispenser 6B include overlapping regions in the direction along the conveyance path of the conveyance part 8.

The preform support part 10 and the opening support part 11 (not illustrated in FIG. 7), which are arranged below the downward-facing nozzle 61, can be configured in substantially the same manner as in the first embodiment described above. Note that in the present embodiment, a preform support part 10 and an opening support part 11 are provided for each of the plurality of downward-facing nozzles 61, as shown in FIG. 7. Thus, the preforms 1 are individually supported. Also note that in FIG. 7, a supporting column 21c on the right side is not illustrated in order to show the dispenser 6B.

Figure 8:
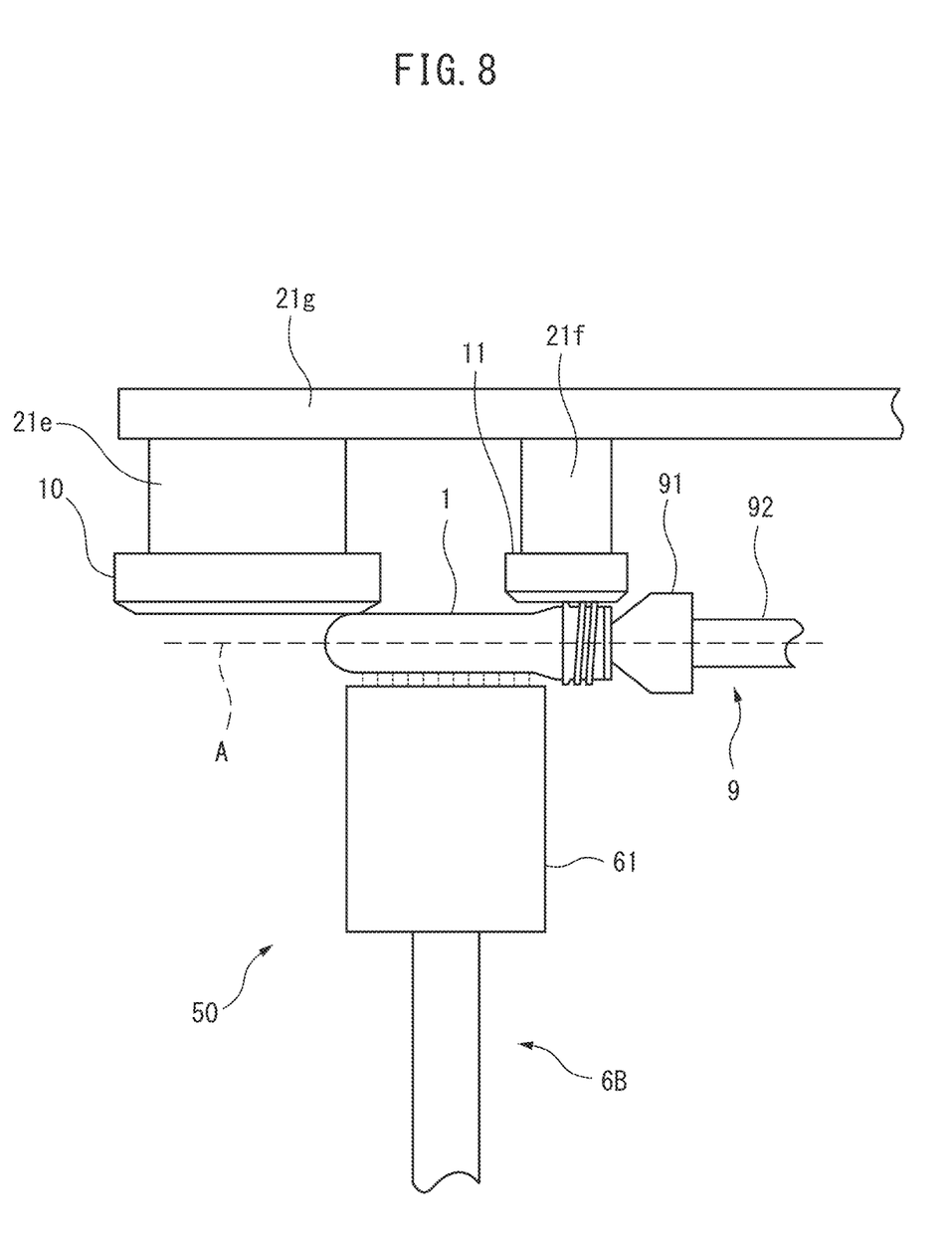
FIG. 8 is a schematic partial side view of a dispenser having a nozzle oriented upward at the time of application of a coating solution.

FIG. 8 is a schematic partial side view of the dispenser 6B including an upward-facing nozzle 61 at the time of application of coating solution. Note that FIG. 8 shows the dispenser 6B as viewed from the right side in FIG. 7, and thus, only a single nozzle 61 is shown. As shown in FIG. 8, the upward-facing nozzle 61 discharges coating solution upwardly. For each upward-facing nozzle 61, a preform support part 10 and an opening support part 11 are arranged above the nozzle 61. Thus, the preform 1 is supported by the preform support part 10 and the opening support part 11 arranged thereabove. The preform support part 10 and the opening support part 11 can be affixed to, for example, a support 21e and a support 21f, respectively. The support 21e and the support 21f can be hung on, for example, a support 21g which extends in the horizontal direction. The support 21g can be affixed to, for example, an unillustrated frame, with using an arbitrary fastener.

The preform coating device 50 according to the second embodiment can achieve the same effects as the preform coating device 5 according to the first embodiment. The preform coating device 50 further comprises a dispenser 6B having the same structure as the dispenser 6A, the dispenser 6B is arranged below the preform 1, and the dispenser 6A is arranged above the preform 1. Thus, it is possible to prevent interference between components such as unillustrated fasteners and frames for affixation of the dispensers 6A, 6B. Thus, enlargement of the device can be prevented. Furthermore, in the dispenser, gas may enter from the slot and bubbles may be present inside the dispenser. Since bubbles can impact the quality of the coating, it is preferable that the bubbles be removed from inside the dispenser. In the dispenser 6B which discharges the coating solution upward, air bubbles naturally rise in the nozzle and are discharged from the slot. Therefore, bubbles can easily be removed from the dispenser 6B.

In the preform coating device 50, the plurality of nozzles 61 of the dispenser 6A and the plurality of nozzles 61 of the dispenser 6B are alternatingly arranged in the direction of the conveyance path. Thus, the dispensers 6A, 6B have overlapping regions in the direction along the conveyance path. Thus, the areas for arrangement of the dispensers 6A, 6B can be reduced. Thus, enlargement of the device can be prevented.

Though preferred embodiments according to the present invention have been described above, the present invention is not limited to these embodiments and various changes and modifications can be made within the scope described in the claims. For example, in the preform coating device 50 according to the second embodiment, the dispensers 6A, 6B have overlapping regions in the direction along the conveyance path. However, the dispensers 6A, 6B need not have overlapping regions in the direction along the conveyance path, and the plurality of downward-facing nozzles 61 may be arranged upstream or downstream of the plurality of upward-facing nozzles 61.

REFERENCE SIGNS LIST 1 preform
1a opening
1b cylindrical body
1c bottom
5 preform coating device
6 dispenser (first dispenser)
6A dispenser (first dispenser, second dispenser)
6B dispenser (first dispenser, second dispenser)
60 head

61 nozzle
8 conveyance part
9 rotary retention part
10 preform support part
11 opening support part

The invention claimed is:

1. A preform coating device, comprising:
   a plurality of rotary retention parts each of which horizontally retains a preform and rotates the preform about an axis of the preform,
   a conveyance part that conveys the preforms by moving the plurality of rotary retention parts, the plurality of rotary retention parts being arranged at predetermined intervals along a conveyance path of the conveyance part,
   a first dispenser that discharges coating solution toward the preforms, and
   a second dispenser having the same structure as the first dispenser,
   wherein the first dispenser and the second dispenser each comprises:
   a head having a structure for feeding the coating solution, and
   a plurality of nozzles in fluid communication with the head, each of the plurality of nozzles having a slot for discharging the coating solution,
   wherein the first dispenser and the second dispenser are arranged alternatingly on a same axis line along the conveyance path;
   wherein the first dispenser and the second dispenser have overlapping regions in a direction along the conveyance path;
   wherein one of the first and second dispensers is arranged below the preforms to be coated so as to discharge the coating solution upwardly;
   wherein the other of the first and second dispensers is arranged above the preforms to be coated so as to discharge the coating solution downwardly;
   wherein the plurality of nozzles are arranged at predetermined intervals along the conveyance path;
   wherein the intervals between the plurality of nozzles are equal to the intervals between the plurality of rotary retention parts; and
   wherein the plurality of nozzles of the first dispenser and the plurality of nozzles of the second dispenser are arranged alternatingly in the direction along the conveyance path.

2. The preform coating device according to claim 1, wherein at least one of the plurality of nozzles has a length adjustment mechanism for adjusting a distance from the head to the slot of the nozzle.

3. The preform coating device according to claim 1, wherein at least one of the plurality of nozzles has a flow rate adjustment mechanism for adjusting a discharge amount of the coating solution from the nozzle.

* * * * *